(12) United States Patent
Gibble

(10) Patent No.: US 10,625,568 B2
(45) Date of Patent: Apr. 21, 2020

(54) ENERGY CONSUMPTION OF A MULTIPLE ZONE HEATING, VENTILATING AND AIR CONDITIONING SYSTEM FOR A VEHICLE AND METHOD

(71) Applicant: VOLVO TRUCK CORPORATION, Göteborg (SE)

(72) Inventor: John Gibble, Chambersburg, PA (US)

(73) Assignee: Volvo Truck Corporation, Göteborg (SE)

( * ) Notice: Subject to any disclaimer, the term of this patent is extended or adjusted under 35 U.S.C. 154(b) by 171 days.

(21) Appl. No.: 15/766,991

(22) PCT Filed: Oct. 9, 2015

(86) PCT No.: PCT/US2015/054854
§ 371 (c)(1),
(2) Date: Apr. 9, 2018

(87) PCT Pub. No.: WO2017/062025
PCT Pub. Date: Apr. 13, 2017

(65) Prior Publication Data
US 2018/0297443 A1    Oct. 18, 2018

(51) Int. Cl.
*B60H 1/00* (2006.01)
*B60H 1/32* (2006.01)

(52) U.S. Cl.
CPC ..... *B60H 1/00764* (2013.01); *B60H 1/00842* (2013.01); *B60H 1/3208* (2013.01); *B60H 2001/3266* (2013.01)

(58) Field of Classification Search
CPC ........... B60H 1/00007; B60H 1/00064; B60H 1/00271; B60H 1/00278; B60H 1/00764; B60H 1/00814; B60H 1/00842; B60H 1/32; B60H 1/3208; B60H 2001/00185; B60H 2001/3266
USPC .................................................. 62/186, 244
See application file for complete search history.

(56) References Cited

U.S. PATENT DOCUMENTS

| 4,425,765 A | 1/1984 | Toshihiko et al. |
|---|---|---|
| 6,454,178 B1 | 9/2002 | Fusco et al. |
| 6,460,356 B1 | 10/2002 | Michikazu et al. |
| 7,260,947 B1 * | 8/2007 | Harrison ............. B60H 1/3208 60/706 |

(Continued)

FOREIGN PATENT DOCUMENTS

WO    9105675 A1    5/1991

OTHER PUBLICATIONS

European Official Action (dated Jun. 17, 2019) for corresponding European App. 15905963.3.

(Continued)

*Primary Examiner* — Edward F Landrum
*Assistant Examiner* — Chang H Park
(74) *Attorney, Agent, or Firm* — WRB-IP LLP

(57) ABSTRACT

A vehicle includes a controller configured to determine when an HVAC system is providing at least one of heating, ventilating and air conditioning to a primary zone and to determine when a drivetrain is providing energy to a power source or the power source is providing surplus energy to the drivetrain, and in response, to activate a low cost energy mode wherein the HVAC system is operated to provide the at least one of heating, ventilating and air conditioning to at least one secondary zone.

31 Claims, 3 Drawing Sheets

(56) References Cited

U.S. PATENT DOCUMENTS

| | | |
|---|---|---|
| 7,562,522 B2 * | 7/2009 | Yan .................... B01D 53/9418 60/286 |
| 2001/0015070 A1 | 8/2001 | Hara |
| 2004/0164171 A1 | 8/2004 | Eisenhour |
| 2004/0168454 A1 * | 9/2004 | Iritani .................... B60H 1/004 62/230 |
| 2005/0268632 A1 | 12/2005 | Yonekura et al. |
| 2011/0166747 A1 | 7/2011 | Wijaya et al. |
| 2012/0142264 A1 | 6/2012 | Sagou |
| 2012/0312520 A1 | 12/2012 | Hoke et al. |
| 2013/0131919 A1 | 5/2013 | Pan |
| 2013/0197719 A1 | 8/2013 | Martini et al. |
| 2015/0183293 A1 | 7/2015 | Kim |

OTHER PUBLICATIONS

International Search Report (dated Jan. 8, 2016) for corresponding International App. PCT/US2015/054854.

International Written Opinion (dated Jan. 8, 2016) for corresponding International App. PCT/US2015/054854.

International Preliminary Report on Patentability (dated Jan. 5, 2018) for corresponding international App. PCT/US2015/054854.

* cited by examiner

ENERGY CONSUMPTION OF A MULTIPLE ZONE HEATING, VENTILATING AND AIR CONDITIONING SYSTEM FOR A VEHICLE AND METHOD

FIELD OF THE INVENTION

The invention relates to Heating, Ventilating and Air Conditioning (HVAC) systems for vehicles and more specifically to improving the efficiency of a vehicle with a multiple zone HVAC system.

BACKGROUND AND SUMMARY

A multiple zone HVAC system may be included in a vehicle to provide heating, ventilating and air conditioning to at least one zone within or about a cabin or cargo hold of the vehicle. Heating, ventilating and air conditioning may include other processes, such as dehumidifying, i.e., maintaining a constant temperature while removing moisture, air filtering, or other processes for affecting a climate or environment of the vehicle.

The cost of energy to operate a multiple zone HVAC system may be defined as a parameter of vehicle efficiency. More specifically, for any given road trip, a vehicle may have a maximum attainable fuel efficiency which may be compromised by energy costs associated with operation of the multiple zone HVAC system. Exemplary embodiments may leverage the use of low cost energy, such as free energy or surplus energy, when available, to advantageously operate the HVAC system, and further, may also inhibit the consumption of energy by the HVAC system when the cost of such energy is high.

According to an embodiment of the invention, a vehicle includes a power source including a drivetrain arranged to receive energy from and provide energy to the power source, a heating, ventilating and air conditioning (HVAC) system arranged to receive energy from the power source, a plurality of zones arranged to controllably receive at least one of heating, ventilating and air conditioning from the HVAC system, the plurality of zones including a primary zone and at least one secondary zone and, a controller operable to determine when the HVAC system is providing at least one of heating, ventilating and air conditioning to the primary zone and to determine when the drivetrain is providing energy to the power source or the power source is providing surplus energy to the drivetrain, and in response, to activate a low cost energy mode wherein the HVAC system is operated to provide the at least one of heating, ventilating and air conditioning to the at least one secondary zone.

According to another embodiment, a method of operating a heating, ventilating and air conditioning (HVAC) system in a vehicle having a plurality of zones arranged to receive heating, ventilating and air conditioning from the HVAC system, including a primary zone and at least one secondary zone, the vehicle having a power source arranged to provide energy to the HVAC system and a drivetrain arranged to receive energy from and provide energy to the power source includes the steps of determining if the HVAC system is providing at least one of heating ventilating and air conditioning to the primary zone and determining at least one of the following conditions, the drivetrain is providing energy to the power source or the power source is providing surplus energy to the drivetrain and in response, activating a low cost energy mode wherein the HVAC system is operated to provide the at least one of heating, ventilating and air conditioning to the at least one secondary zone.

BRIEF DESCRIPTION OF THE DRAWINGS

The invention will be better understood by reference to the following detailed description read in conjunction with the appended drawings, in which.

DETAILED DESCRIPTION OF THE INVENTION

Figure 1:
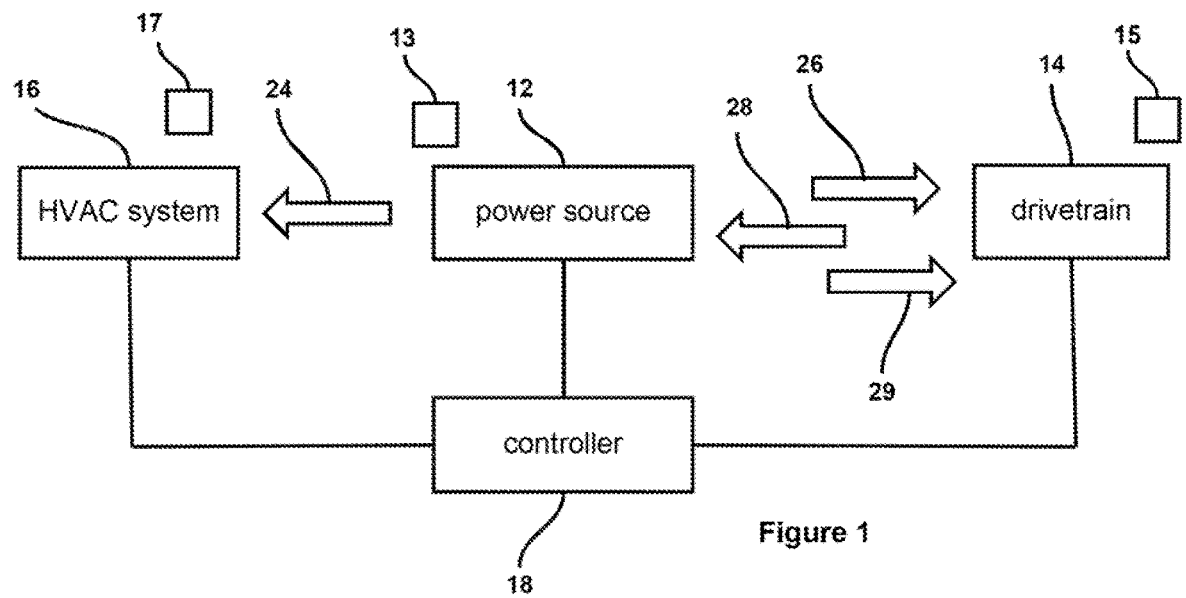
FIG. 1 is a schematic of a vehicle according to the invention.

An exemplary embodiment of a vehicle 10 according to the present invention is illustrated schematically in FIG. 1. Vehicle 10 includes a power source 12 arranged to provide motive energy 26, such as mechanical or electrical energy, to a drive train 14 for, among other purposes, propelling vehicle 10. Motive energy 26 may be produced by power source 12 through the consumption of a fuel such as a petroleum based fuel if power source 12 takes the form of an internal combustion engine, or as another example, as electricity if power source 12 takes the form of a battery. Vehicle 10 also includes a multiple zone HVAC system 16 arranged to receive accessory energy 24 from power source 12, for example, HVAC system 16 may operate by mechanical or electrical accessory energy 24 received from power source 12.

As shown in FIG. 1, the power source 12 may be arranged to receive free energy 28 from drivetrain 14 during certain periods of operation of vehicle 10. Free energy 28 is considered to be "free" in the sense that it is not directly derived from the consumption of an onboard stored fuel such as the aforementioned petroleum based fuel or electricity. According to exemplary embodiments, free energy 28 may be derived from the kinetic energy associated with coasting or downhill movement of vehicle 10. Alternatively, or in combination therewith, free energy may be derived from devices incorporated to the drivetrain which harvest energy from vehicle waste heat, or energy from solar or wind or other sources. As may be appreciated from the above discussion, the flow of free energy 28 to power source 12 from drivetrain 14 may occur in addition to or in place of the motive energy 26 delivered by power source 12 to drivetrain 14.

As further shown in FIG. 1, vehicle 10 may, during certain periods of operation, provide surplus energy 29 from power source 12 to drivetrain 14. For example, if power source 12 takes the form of an internal combustion engine, and if a load is applied to power source 12 in order to heat an exhaust after treatment system (not shown) of the engine, then the excess energy created as a consequence of the heating procedure may be considered to be surplus energy 29. As another example, if power source 12 is being operated in a first brake specific fuel consumption (BSFC) mode, it may be determined that a second BSFC mode may be more efficient regardless of whether the second mode results in surplus energy 29 being delivered from power source 12 to drivetrain 14. As yet another example, motive energy 26 provided to drivetrain 14 may be greater than the energy needed to accelerate or propel vehicle 10 at a rate called for by an operator. Such energy may be considered to be surplus energy 29.

Vehicle 10 may also include a controller 18 which may, among other functions, determine when low cost energy, such as free energy or surplus energy is available for use as accessory energy 24 to operate HVAC system 16. More specifically, controller 18 may determine when free energy 28 is being received by power source 12 from drivetrain 14 or when surplus energy 29 is being received by drivetrain 14 from power source 12. As shown in FIG. 1, controller 18 may be operatively connected to multiple zone HVAC system 16, power source 12, and drivetrain 14. Controller 18 is shown as a single device but may comprise several onboard or remote devices associated with the operation of vehicle 10. Further, controller 18 may include devices, sensors, and control logic for detecting a state or condition or measuring an aspect of operation of vehicle 10 to determine when power source 12 is receiving free energy 28 from drivetrain 14 or when power source 12 is providing surplus energy to drivetrain 14. For example, if power source 12 takes the form of an internal combustion engine and vehicle 10 is travelling downhill and if the engine is rotating at a speed above idle despite a lack of depression of an accelerator pedal (not shown), then controller 18 may determine that power source 12 is receiving free energy 28 from drivetrain 14. As another example, if power source 12 takes the form of a battery and vehicle 10 is provided with one or more traction motors (not shown) arranged for regenerative braking, then power source 12 may be determined to be receiving free energy 28 from drivetrain 14 during braking of vehicle 10. As another example, drivetrain 14 may incorporate a measuring device 15, such as an ammeter (not shown) or dynamometer (not shown), between the power source 12 and drivetrain 14 to determine when drivetrain 14 is providing free energy 28 to or receiving surplus energy 29 from power source 12. As yet another example, drivetrain 14 may be provided with solar panels (not shown) and power source 12 may be determined to be receiving free electrical energy 28 from drivetrain 14 during day time. One of ordinary skill in the art will appreciate the myriad solutions available for determining when free energy 28 is being provided by drivetrain 14 to power source 12 or when surplus energy 29 is being provided by power source 12 to drivetrain 14.

When controller 18 determines that power source 12 is receiving free energy 28 from drivetrain 14, or when controller 18 determines that power source 12 is delivering surplus energy to drivetrain 14, a low cost energy mode may be activated for vehicle 10. More specifically, controller 18 may include control logic and/or sensors for determining whether a low cost energy mode based on free energy or surplus energy may be activated. For example, controller 18 may activate the low cost energy mode if free energy 28 is being received by power source 12 from drivetrain 14 while multiple zone HVAC system 16 is being operated. Other characteristics of the vehicle 10 and the accessories thereof may be included in determining whether low cost energy is sufficiently available to activate the low cost energy mode. For example, controller 18 may determine that the free energy 28 being provided to the power source 12 from the drivetrain 14 or the surplus energy 29 being supplied by the power source 12 to the drivetrain 14 fails to conform to a criterion, and in response, may inhibit activation of the low cost energy mode. For example, controller 18 may determine that the free energy 28 being received by power source 12 or the surplus energy 29 being received by drivetrain 14 is below a certain horsepower or wattage threshold and in response, inhibit activation of the low cost energy mode.

Further, during certain periods of operation of vehicle 10, it may be advantageous to limit the consumption of accessory energy 24 by HVAC system 16 if vehicle efficiency would be excessively diminished. Thus, in addition to determining whether low cost energy is available for operating HVAC system 16, controller 18 may further determine whether the cost of accessory energy 24 from power source 12 to operate HVAC system 16 is greater than a threshold cost. The threshold cost may be pre-established or dynamically calculated. For example, if providing accessory energy 24 to HVAC system 16 would require operating the power source 12 at a brake specific fuel consumption (BSFC) level below a certain threshold then controller 18 may determine that the cost of accessory energy 24 exceeds the threshold cost. As another example, if controller 18 determines that providing accessory energy 24 to HVAC system 16 may cause the temperature of a thermostat 13 (FIG. 1) for a power source cooling fan (not shown) to rise above a threshold temperature, then controller 18 may determine that the cost of accessory energy consumption by HVAC system 16 is above the threshold cost.

The rate of consumption of accessory energy 24 by HVAC system 16 may also be used in determining whether the threshold cost is exceeded. The rate of consumption of accessory energy 24 by HVAC system 16 may be established by direct measurement, for example, a measuring device 17 such as an ammeter (not shown) or dynamometer (not shown), may be disposed between the power source 12 and HVAC system 16 to provide information regarding the rate of consumption of accessory energy 24 by HVAC system 16. Alternatively, the rate of consumption of accessory energy 24 by HVAC system 16 may be inferred from empirical data. For example, known conditions of vehicle operation such as temperatures, pressures, mass flow rates and fuel consumption may be used to calculate the rate of consumption of accessory energy 24 by HVAC system 16. If, for example, the rate of consumption of accessory energy 24 by HVAC system 16 exceeds the rate at which free energy 28 is delivered to power source 12, controller 18 may determine that the cost of accessory energy 24 exceeds the threshold cost.

Upon determining that the cost of accessory energy 24 is above the threshold cost, controller 18 may inhibit energy consumption of HVAC system 16. In other words, if controller 18 determines that operation of HVAC system 16 would result in excessively diminished vehicle efficiency, then controller 18 may reduce or suspend the delivery of accessory energy 24 to HVAC system 16. Alternatively, or in combination, controller 18 may also operate HVAC system 16 with reduced functionality or performance. For example, if HVAC system 16 is being operated to provide a heating, ventilating or air conditioning function to a primary zone as well as a defrost function to a windshield or window of vehicle 10, controller 18 may turn off the heating, ventilating or air conditioning to the primary zone while maintaining operation of the defrost function. Controller 18 may resume normal operation of the HVAC system 16 according to, for example, a preset length of time, or as another example, amelioration of the high cost condition. An operator may be provided with the option of overriding the controller 18 to maintain normal operation of HVAC system 16 regardless of the loss to vehicle efficiency.

Figure 2:
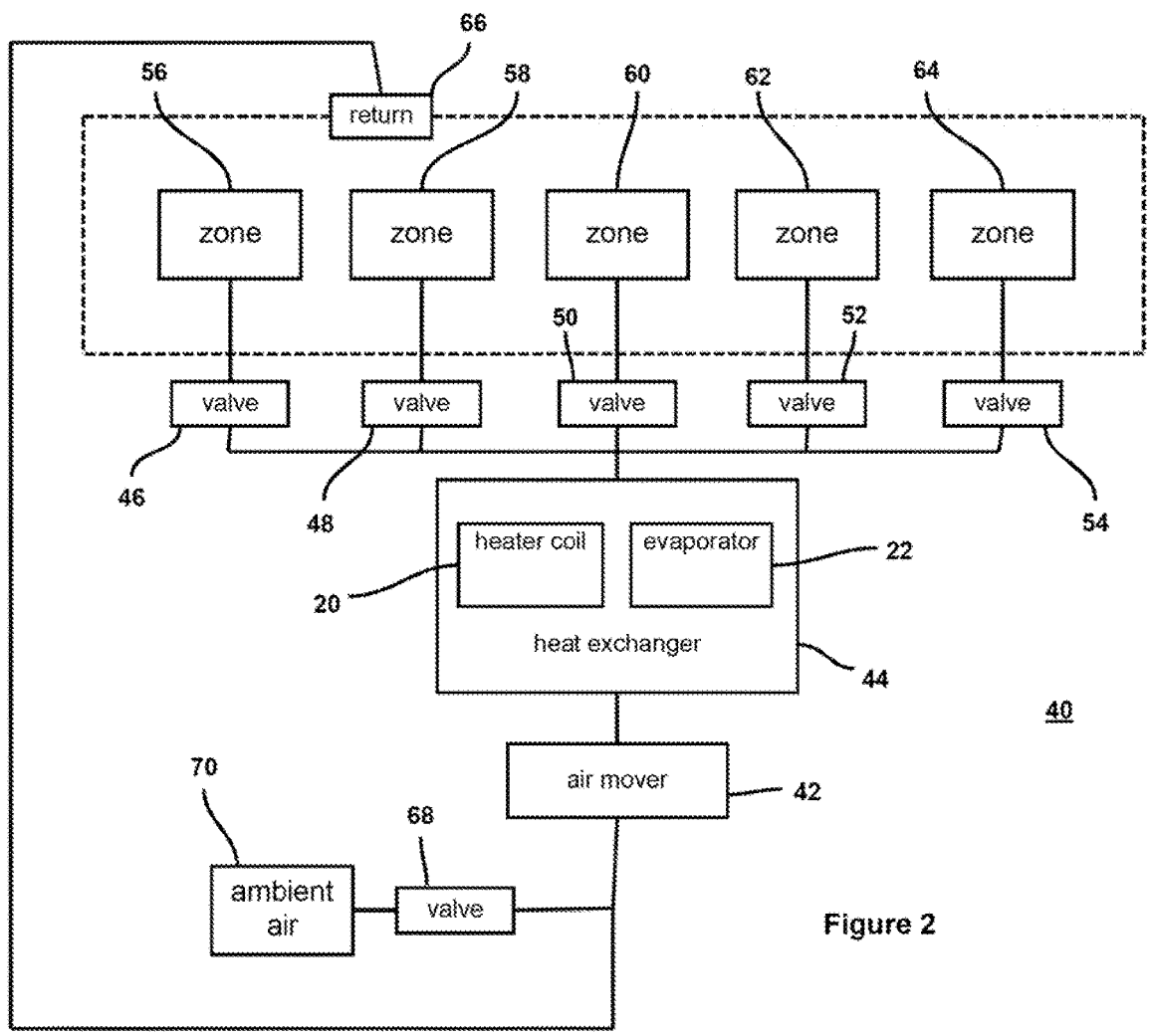
FIG. 2 is a schematic of an exemplary embodiment of a duct system for a multiple zone HVAC system according to the invention.

FIG. 2 illustrates an exemplary layout of a duct system 40 of multiple zone HVAC system 16 according to an exemplary embodiment of the invention. Duct system 40 may include an air mover 42 such as an electric fan (not shown) to flow air across a heat exchanger 44 towards a plurality of valves 46, 48, 50, 52 and 54 each of which may control the flow of air to a respective zone 56, 58, 60, 62 and 64 of vehicle 10. Heat exchanger 44 may include several devices such as a heater coil 20 through which coolant heated by power source 12 may circulate for heating the ducted air and an evaporator 22 through which a working fluid may circulate for cooling the ducted air. Duct system 40 may also include at least one return 66 to allow air flow from zones 56, 58, 60, 62 and 64 towards air mover 42. HVAC system 16 may also include a valve 68 for allowing ambient air 70 to enter air mover 42 for delivery to one or more of the zones 56, 58, 60, 62 and 64 of HVAC system 16.

Figure 3:
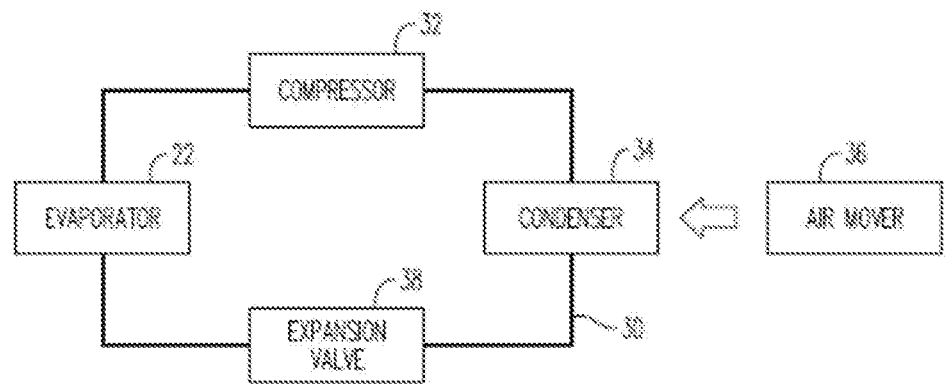
FIG. 3 is a schematic of an exemplary embodiment of a working fluid system for a multiple zone HVAC system according to the invention.

A working fluid system 30 of multiple zone HVAC system 16 according to an exemplary embodiment of the invention is shown in FIG. 3. System 30 may include a compressor 32 for compressing a working fluid to flow through a cooling condenser 34. System 30 may also include an air mover 36 such as an electric fan (not shown) for moving air across the condenser to further cool the working fluid. After exiting condenser 34, the working fluid may flow through an expansion valve 38 for expanding and reducing the temperature of the working fluid prior to flowing through evaporator 22. The evaporator 22 may thereby cool the ducted air flowing through heat exchanger 44 (FIG. 2).

Figure 4:
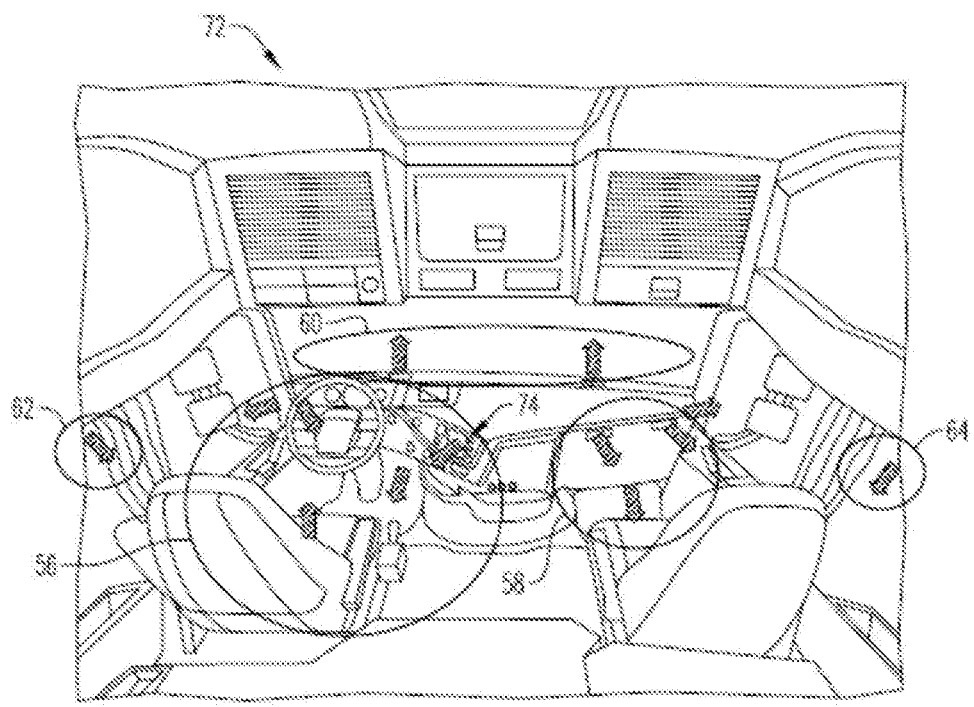
FIG. 4 is an illustration of a vehicle cabin with primary and secondary zones of a multiple zone HVAC system according to the invention

FIG. 4 illustrates a cabin 72 of a vehicle 10 in the form of a tractor-trailer combination vehicle according to an exemplary embodiment. Cabin 72 includes zones 56, 58, 60, 62 and 64 corresponding to the zones 56, 58, 60, 62 and 64 shown in FIG. 2. More specifically, zone 56 is associated with a driver area, zone 58 is associated with a passenger area, zone 60 is associated with a front windshield, zone 62 is associated with a driver side sleeper area and zone 64 is associated with a passenger side sleeper area. It should be noted that the zone layout illustrated in FIG. 3 is exemplary and that a zone may be defined anywhere in or about vehicle 10. For example, a zone may be defined by an armrest, a headrest, an area within a cargo hold, an area exterior of the vehicle such as a roof of a tractor or trailer, an exterior surface of the windshield, a side mirror, an area between a tractor and trailer, etc.

As further shown in FIG. 4, multiple zone HVAC system 16 may include an HVAC system interface 74 operatively connected to multiple zone HVAC system 16 and controller 18. Interface 74 may allow one or more zones 56, 58, 60, 62, and 64 of multiple zone HVAC system 16 to be selected as primary zones. HVAC system interface 74 may also allow one or more of the remaining zones 56, 58, 60, 62 and 64, i.e., zones which have not been selected as primary zones, to be selected as secondary zones. Alternatively, each zone not selected as a primary zone may be automatically selected as a secondary zone by HVAC system 16. Further, HVAC system 16 may include temperature sensors (not shown) to provide temperature information for each zone 56, 58, 60, 62 and 64 to interface 74. Zone temperature information may be used by interface 74 and HVAC system 16 to provide thermostatic control of the heating, ventilating and air conditioning process provided to each zone 56, 58, 60, 62, and 64.

HVAC system interface 74 may allow a driver or occupant to select a thermostatically controlled heating, ventilating or air conditioning process to be provided by HVAC system 16 to one or more of the selected primary zones of zones 56, 58, 60, 62 and 64 without providing such heating ventilating or air conditioning process to the remaining zones 56, 58, 60, 62 and 64. For example, a driver or occupant may select thermostatically controlled cooling to be provided to driver zone 56 without providing such cooling to secondary zones 58, 60, 62, and 64. In accordance with such a selection, HVAC system 16 may open valve 46 (FIG. 2) and close each of valves 48, 50, 52 and 54 during the thermostatically controlled cooling of driver zone 56.

An increase in fuel economy may be realized by reducing the number of primary zones selected to receive heating, ventilating or air conditioning from HVAC system 16. However, and as shown in FIG. 4, the primary and secondary zones in the cabin may be exposed to one another, and thus, the heating, ventilating or air conditioning process or processes applied to the one or more selected primary zones may be compromised by the secondary zones. For example, heat transfer from one or more secondary zones into the one or more selected primary zones may cause a decrease in the time interval between periods of operation of HVAC system 16 during thermostatic control of the one or more primary zones. This frequent on/off cycling of the HVAC system 16 may contribute to wear of various components of HVAC system 16 and, if such cycling is audible, may also contribute to driver fatigue.

One solution to this problem may be provided by modifying the control of HVAC system 16 when the zones 56, 58, 60, 62 and 64 are differentiated between primary and secondary zones. For example, HVAC system 16 may include logic for providing disproportionate control of a parameter in the one or more primary zones when the cabin 72 is differentiated between primary and secondary zones. For example, controller 18 may include control logic and/or sensors to determine if HVAC system 16 is being operated to provide thermostatically controlled cooling to one or more primary zones, and in response, reduce the temperature at which HVAC system 16 ends a cooling cycle of the one or more primary zones. This solution may reduce cycling of the HVAC system 16, however, the relatively large temperature changes in the thermostatically controlled primary zone may be discomforting to the driver and may also compromise the fuel efficiency gains achieved by differentiating the cabin into controlled primary and non-controlled secondary zones.

Exemplary embodiments according to the present invention may provide solutions to the aforementioned problems. More specifically, if HVAC system 16 is being operated to provide heating, ventilating or air conditioning to at least one primary zone 56, 58, 60, 62, and 64 and if it is determined that free energy 28 is being provided by drivetrain 14 to power source 12 or surplus energy is being provided by power source 12 to drivetrain 14, then a low cost energy mode may be activated and HVAC system 16 may be operated to provide heating, ventilating or air conditioning to at least one of the remaining secondary zones 56, 58, 60, 62, and 64. It is particularly advantageous to provide heating ventilating or air conditioning to one or more of the secondary zones when such low cost energy is available since the accessory energy 24 (FIG. 1) used to operate HVAC system 16 may be provided without a significant loss to vehicle efficiency. For example, during the low cost energy mode, HVAC system 16 may be powered by energy derived from the kinetic energy of the vehicle during coasting or downhill travel, regenerative braking, or other sources, as previously described. Moreover, and as will be described further below, since the low cost energy mode allows for the secondary zones to be controlled the same as or differently than the primary zones, gains in vehicle efficiency may be realized without compromising the comfort or convenience of a driver or occupant of vehicle 10.

Consider again the above described example wherein a driver has operated interface 74 to select thermostatically controlled cooling to be provided to driver zone 56 without such cooling being provided to secondary zones 58, 60, 62, and 64. In view of this example, a method 100 according to an exemplary embodiment of the invention will be described in reference to FIG. 5. In step 102, it may be determined whether HVAC system 16 is being operated. In step 104, it may be determined whether the cost of accessory energy 24 is above a threshold, as previously described. If the cost of accessory energy 24 is acceptable, then the method may skip to step 112.

In step 106, controller 18 may determine whether to inhibit consumption of accessory energy 24 by HVAC system 16. The extent to which the consumption of accessory energy 24 is inhibited may be proportional to the extent that the use of such energy would reduce the efficiency of vehicle 10. Thus, if the cost of accessory energy 24 greatly exceeds the threshold, controller 18 may entirely suspend the delivery of accessory energy 24 to HVAC system 16 according to step 106. Such circumstances may arise, for example, where the entirety of the energy production of power source 12 is in demand for providing motive energy 26 to drivetrain 14 to ascend a particularly steep grade. In other circumstances, accessory energy 24 may be less costly to vehicle efficiency and thus, it may be determined that merely decreasing the functionality or performance of HVAC system 16 according to step 108 may be adequate to maintain a desired level of vehicle efficiency. Thus, for example, the duty cycle of compressor 32 (FIG. 3) may be reduced or the speed of air mover 42 (FIG. 2) may be limited to preserve accessory energy 24. As previously described, the accessory energy 24 being provided to HVAC system 16 may be in use to provide a critical function, such as a defrost function of a front windshield of vehicle 10, or an operator may override a determination to inhibit consumption of accessory energy 24. Accordingly, in such circumstances, accessory energy 24 may continue to be provided to HVAC system 16 regardless of the relatively high cost of such energy to vehicle efficiency and the method may skip to step 112.

In step 112, it may be determined whether HVAC system includes at least one primary zone and at least one secondary zone and whether HVAC system is being operated to provide heating, ventilating or air conditioning to only the at least one selected primary zone. Since, in the present example, HVAC system is providing thermostatic cooling to only driver zone 56, the method may proceed to steps 114 and 116 wherein it is determined whether the drivetrain 14 is providing free energy to power source 12, or whether the power source 12 is providing surplus energy 29 to the drivetrain 14, respectively, and as previously described.

In step 118, it is determined whether to activate the low cost energy mode. Step 118 may be determined based on the affirmative determination of step 112 in combination with step 114 or step 116. Alternatively, other aspects of the operation of vehicle 10 and the accessories thereof may be included in determining whether to activate the low cost energy mode or inhibit activation of the low cost energy mode. For example, controller 18 may include control logic and data, such as route information, as well as sensors, such as a GPS sensor (not shown), for predicting or anticipating the duration of time or distance that low cost energy may be available to HVAC system 16 and based on such predictions or anticipation control the activation of the low cost energy mode. In exemplary embodiments, vehicle route information may be correlated with vehicle speed information and GPS sensor information to control activation of the low cost energy mode. Thus, for example, controller 18 may determine that vehicle 10 is approaching a downhill road grade and that the grade extends in excess of a threshold distance, and in response, activate the low cost energy mode.

According to exemplary embodiments, the heating ventilating or air conditioning process applied to the secondary zone or zones and the manner in which the process is controlled during activation of the low cost energy mode may be determined by inputs to the HVAC system interface 74 by a driver or occupant, or alternatively, may be determined automatically by HVAC system 16 or controller 18. For example, and as will be described further below, HVAC system 16 may include selectable settings, such as automatic, maximum and thermostatic. The automatic setting may be a default setting, i.e., selected by HVAC system 16 in the absence of a selection by a driver or occupant. Alternatively, in the absence of a setting selection by a driver or occupant of vehicle 10, HVAC system 16 may inhibit activation of the low cost energy mode.

Figure 5:
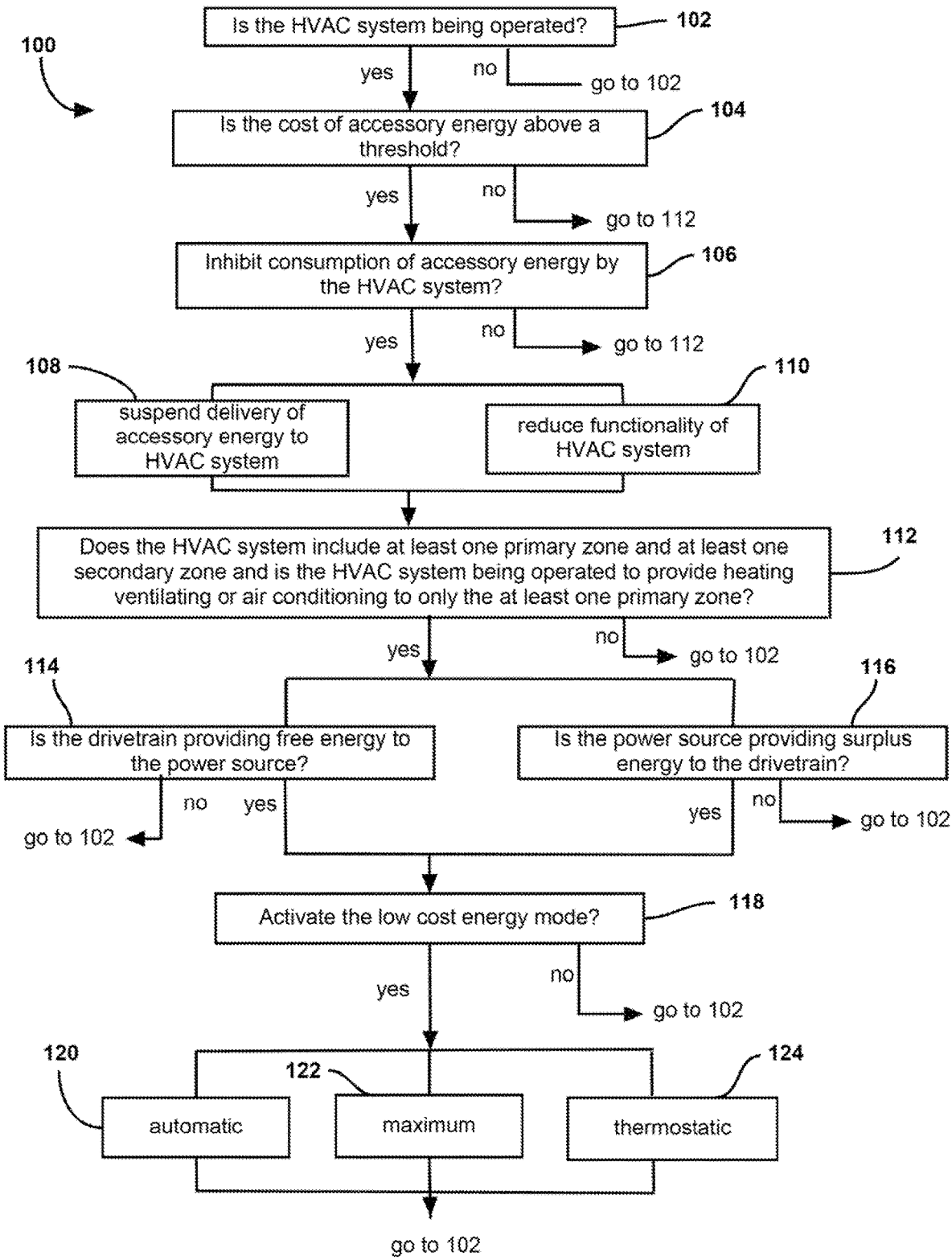
FIG. 5 is a schematic of a method according to an exemplary embodiment of the invention.

If the automatic setting is selected, then the method 100 of FIG. 5 may proceed to step 120. In step 120, HVAC system 16 may automatically provide the process and control being applied to the primary zone 56 to the secondary zones 58, 60, 62 and 64. Thus, with regard to the above described example, HVAC system 16 may open each of valves 48, 50, 52, and 54 (FIG. 2) during activation of the low cost energy mode to provide cooling to each of the secondary zones 58, 60, 62, and 64. Note that during the automatic setting, the cooling provided to each of the secondary zones 58, 60, 62, and 64 will cycle on and off according to the thermostatic control of the primary zone 56. According to this exemplary embodiment, since the thermostatic control of the primary zone 56 remains unchanged, and particularly the on and off cycling of air mover 42, activation of the low cost energy mode may be advantageously imperceptible to the driver or occupants in the primary zones.

Alternatively, and as further shown in FIG. 5, if the maximum setting is selected, the method 100 proceeds to step 122. In the maximum setting, like the automatic setting, HVAC system 16 may open each of valves 48, 50, 52, and 54 (FIG. 2) to provide the heating, ventilating or conditioning being provided to each primary zone to each of the secondary zones 58, 60, 62, and 64. However, in the maximum setting, HVAC system 16 may be operated such that the heating, ventilating or air conditioning is provided continuously, as opposed to thermostatically, to the primary and secondary zones. Thus, with regard to the above described example, during activation of the low cost energy mode, each of the zones 56, 58, 60, 62, and 64 may be cooled below the temperature set for thermostatic control of the primary zone 56. Note that, advantageously, cooling of the primary zone 56 may continue to be thermostatically controlled by HVAC system 16 during activation of the low cost energy mode in the maximum setting by modulation of valve 46 according to the temperature set at HVAC system interface 74. Providing extra cooling to the secondary zones 58, 60, 62, and 64 while maintaining thermostatic control of the primary zone 56 during activation of the low cost energy mode may further increase vehicle efficiency and at the same time, improve cabin comfort and reduce driver fatigue.

During extended periods of activation of the low cost energy mode in the maximum setting, the continuous operation of HVAC system 16 may result in an unacceptable temperature change in the primary and/or secondary zones. Accordingly, HVAC system 16 may include a "thermostatic" setting as shown in step 124 of FIG. 5. HVAC system interface 74 may allow a driver or occupant to select the thermostatic setting and additionally, to set the temperature at which the heating, ventilating or air conditioning process provided by HVAC system 16 to the selected secondary zones is thermostatically controlled during activation of the low cost energy mode. For example, if driver zone 56 is provided with thermostatic cooling according to a first temperature, then each of secondary zones 58, 60, 62, and 64 may be provided with cooling during activation of the low cost energy mode according to a thermostatically controlled second temperature. The second temperature may be lower than the first temperature. Advantageously, HVAC system 16 may modulate each of valves 46, 48, 50, 52 and 54 to accommodate the differences in thermostatic control between the primary and secondary zones during activation of the low cost energy mode in the thermostatic setting.

In each of above described automatic, maximum, and thermostatic settings, valve 68 (FIG. 2) may be modulated by HVAC system 16 during activation of the low cost energy mode to provide ventilation of ambient air 70 (FIG. 2) in addition to cooling or heating of the primary and secondary zones. Further, vehicle 10 may include occupancy sensors (not shown) operatively connected between each of zones 56, 68, 62 and 64 and HVAC system 16. Thus, with regard to the above-described example, if one or more secondary zones, such as zone 62 and zone 64 associated with the cabin sleeping area are occupied then HVAC system 16 may modulate valves 52 and 54 (FIG. 2) to prevent HVAC system 16 from providing extra cooling or heating to such occupied zones. HVAC system 16 and/or controller 18 may also include logic to provide for continuous operation of air mover 36 (FIG. 3) during activation of the low cost energy mode to maintain condenser 34 as close to ambient temperature as possible during activation of the low cost energy mode.

The invention has been described in terms of preferred principles, embodiments, and componentry; however, those skilled in the art will understand that some substitutions may be made without departing from the scope of the invention as defined by the appended claims.

What is claimed is:

1. A vehicle, comprising:
   a power source including a drivetrain arranged to receive energy from and provide energy to the power source;
   a heating, ventilating and air conditioning (HVAC) system arranged to receive energy from the power source;
   a plurality of zones arranged to controllably receive at least one of heating, ventilating and air conditioning from the HVAC system, the plurality of zones including a primary zone and at least one secondary zone; and,
   a controller configured to determine when the HVAC system is providing the at least one of heating, ventilating and air conditioning to the primary zone and to determine when the drivetrain is providing energy to the power source or the power source is providing surplus energy to the drivetrain, and in response, to activate a low cost energy mode wherein the HVAC system is operated to provide the at least one of heating, ventilating and air conditioning to the at least one secondary zone.

2. The vehicle of claim 1, wherein the controller is further configured to determine when the energy for operating the HVAC system exceeds a cost threshold, and in response, to inhibit the consumption of energy by the HVAC system.

3. The vehicle of claim 2, wherein the controller inhibits the consumption of energy by the HVAC system by at least one of reducing the delivery of energy to the HVAC system and reducing the functionality or performance of the HVAC system.

4. The vehicle of claim 2, wherein the controller determines that the cost energy for operating the HVAC system exceeds a threshold when operation of the HVAC system would require operating the power source at a brake specific fuel consumption level below a threshold.

5. The vehicle of claim 4, wherein the HVAC system further comprises a working fluid system with an air mover and a condenser and wherein the HVAC system is configured to operate the air mover to continuously move air across the condenser during activation of the low cost energy mode.

6. The vehicle of claim 2, wherein the controller determines that the cost energy for operating the HVAC system exceeds a threshold when operation of the HVAC system would cause the temperature of an electrical cooling fan thermostat to rise above a threshold temperature.

7. The vehicle of claim 1, wherein the HVAC system further comprises,
   a duct system including a plurality of valves operable by the HVAC system to control the at least one of the heating, ventilating and air conditioning receivable in each of the plurality of zones;
   a heat exchanger connected in the duct system, the heat exchanger being configured to heat or cool air in the duct system;
   an air mover connected in the duct system, the air mover being configured to move air across the heat exchanger, through each of the valves and into each of the plurality of zones;
   wherein the HVAC system is configured to receive at least one input selecting the primary zone and a first temperature for thermostatic control of the primary zone, to open each valve associated with the primary zone, and to operate the air mover and the heat exchanger to thermostatically control the at least one of heating, ventilating and air conditioning selected for the primary zone according to the first selected temperature.

8. The vehicle of claim 7, wherein the HVAC system is further configured to receive an input selecting the at least one secondary zone selecting the at least one secondary zone automatically.

9. The vehicle of claim 8, wherein the HVAC system is further configured to open each valve associated with each selected secondary zone to provide the at least one of heating, ventilating and air conditioning to each at least one secondary zone during activation of the low cost energy mode.

10. The vehicle of claim 9, wherein the HVAC system is further configured to operate the air mover and the heat exchanger such that during activation of the low cost energy mode the at least one of heating, ventilating and air conditioning is provided continuously to each selected secondary zone.

11. The vehicle of claim 10, wherein the HVAC system is further configured to modulate each valve associated with the primary zone to provide thermostatic control of the primary zone according to the first selected temperature during activation of the low cost energy mode.

12. The vehicle of claim 10, wherein the duct system further comprises a valve for allowing ambient air to enter the air mover and wherein the HVAC system is configured to open the valve during activation of the low cost energy mode.

13. The vehicle of claim 9, wherein the HVAC system is further configured to receive an input indicting which, if any, secondary zone is occupied and, in response, to close each valve associated with each occupied secondary zone during activation of the low cost energy mode.

14. The vehicle of claim 8, wherein the HVAC system is further configured to receive an input selecting a second temperature for thermostatic control of the at least one secondary zone during activation of the low cost energy mode.

15. The vehicle of claim 14, wherein the HVAC system is further configured to modulate each valve associated with the primary zone to provide thermostatic control of the primary zone according to the first selected temperature during activation of the low cost energy mode and to modulate each valve associated with the at least one secondary zone to provide thermostatic control of the at least one secondary zone during activation of the low cost energy mode.

16. The vehicle of claim 1, wherein the controller is configured to determine whether the low cost energy being provided to the power source from the drivetrain or the surplus energy being provided from the power source to the drivetrain fails to conform to a criterion and, in response, to inhibit activation of the low cost energy mode.

17. The vehicle of claim 1, wherein the controller determines that the HVAC system is providing surplus power to the drivetrain when a load is applied to the power source to provide heat to an exhaust after treatment system.

18. The vehicle of claim 1, wherein the controller determines that the power source is providing surplus energy to the drivetrain when a speed of the power source is increased to attain a brake specific fuel consumption level above a threshold.

19. The vehicle of claim 1, wherein the controller determines that the HVAC system is providing surplus energy to the drive train when the motive energy being provided to the drivetrain exceeds a flow rage for propelling or accelerating the vehicle according to an operator demand.

20. A method of operating a heating, ventilating and air conditioning (HVAC) system in a vehicle having a plurality of zones arranged to receive at least one of heating, ventilating and air conditioning from the HVAC system, including a primary zone and at least one secondary zone, the vehicle having a power source arranged to provide energy to the HVAC system and a drivetrain arranged to receive energy from and provide energy to the power source, comprising the steps of:

determining if the HVAC system is providing the at least one of heating ventilating and air conditioning to the primary zone and determining at least one of the following conditions, the drivetrain is providing energy to the power source or the power source is providing surplus energy to the drivetrain; and in response, activating a low cost energy mode wherein the HVAC system is operated to provide the at least one of heating, ventilating and air conditioning to the at least one secondary zone.

21. The method of claim 20, Rather comprising determining when the energy for operating the HVAC system exceeds a cost threshold, and in response, inhibiting the consumption of energy by the HVAC system.

22. The method of claim 21, wherein inhibiting the consumption of energy by the HVAC system comprises at least one of reducing the delivery of energy to the HVAC system or reducing the functionality or performance of the HVAC system.

23. The method of claim 21, wherein determining whether the cost of energy for operating the HVAC system exceeds a threshold includes determining when operation of the HVAC system would require operating the power source at a brake specific fuel consumption level below a threshold.

24. The method of claim 21, wherein determining whether the cost of energy for operating the HVAC system exceeds a threshold includes determining when operation of the HVAC system would cause the temperature of a power source cooling fan thermostat to rise above a threshold temperature.

25. The method of claim 20, further comprising thermostatically controlling the at least one of heating ventilating and air conditioning provided to the at least one primary zone according to a first temperature.

26. The method of claim 25, further comprising thermostatically controlling the at least one of heating, ventilating and air conditioning provided to the at least one secondary zone according to a second temperature during activation of the low cost energy mode.

27. The method of claim 20, further comprising continuously providing the at least one of heating ventilating and air conditioning to the at least one secondary zone during activation of the low cost energy mode.

28. The method of claim 20, further comprising ventilating the primary zone and the at least one secondary zone with ambient air during activation of the low cost energy mode.

29. The method of claim 20, wherein determining that surplus energy is being provided to the drivetrain includes determining when a load is applied to the power source for heating an exhaust after treatment system.

30. The method of claim 20, wherein determining that surplus energy is being provided to the drivetrain includes determining when motive energy being provided to the drivetrain exceeds a flow rate for propelling or accelerating the vehicle according to an operator demand.

31. A non-transitory computer readable medium storing instructions that when executed by a controller performs the method of claim 20.

* * * * *